Sept. 12, 1967 S. CSIMMA 3,340,935
VINE CROP HARVESTING MACHINE
Filed July 30, 1964 8 Sheets-Sheet 1

INVENTOR
SANDOR CSIMMA
BY
ATTORNEY

United States Patent Office 3,340,935
Patented Sept. 12, 1967

3,340,935
VINE CROP HARVESTING MACHINE
Sandor Csimma, San Jose, Calif., assignor to FMC Corporation, San Jose, Calif., a corporation of Delaware
Filed July 30, 1964, Ser. No. 386,271
9 Claims. (Cl. 171—14)

The present invention pertains to the harvesting of vine grown crops, such as tomatoes, and more particularly relates to a self-propelled harvesting machine for gathering and separating the vines and fruit.

More specifically, the harvesting machine of the present invention constitutes a further development in a harvesting machine of the type disclosed in the pending application of Looker et al., Ser. No. 127,199, filed July 27, 1961, now forfeited, which application is assigned to the same assignee as the present invention. The present development concerns, among other features, a structural arrangement governing the flow path of the harvested tomatoes, vines and other material through the harvesting machine whereby the manual sorting operation is facilitated and the output of the machine is increased. Other features relate to structure which assures more gentle handling of the relatively fragile fruit, and to mechanical and structural organizations which contribute to the efficiency of the machine and towards reducing fatigue of the personnel working on the machine.

An object of the present invention is to provide an improved vine crop harvesting machine.

Another object of the invention is to provide an improved organization of fruit and vine conveying means in a vine crop harvester.

Another object is to provide an improved article transfer apparatus, between a supply conveyor and an elevator conveyor, which prevents bridging i.e., a flow-blocking accumulation of the articles, and accommodates changes in inclination of the elevator conveyor.

Another object of the invention is to provide an improved drive train for a self-propelled harvesting machine.

A further object is to provide a chute for lowering loose, fragile fruit without rupturing or otherwise damaging the fruit.

Another object is to provide a harvesting machine wherein once sorted fruit does not mingle with unsorted fruit.

Other objects and advantages of the present invention will become apparent from the following description and from the accompanying drawings, wherein:

FIGURE 10 is a diagrammatic, operational view, partly broken away, of a chain oscillating mechanism shown in FIGURE 5.

FIGURE 11 is an enlarged fragmentary detail of the uppermost chain flight shown in FIGURE 5.

FIGURE 12 is an enlarged fragmentary detail of a rubber belt which underlies the uppermost chain flight in FIGURE 5.

FIGURE 13 is an enlarged fragmentary section taken along lines 13—13 on FIGURE 4.

FIGURE 14 is a diagrammatic vertical section, taken along lines 14—14 on FIGURE 2, which illustrates a chute for lowering fruit discharged from the harvesting machine into collecting bins or the like.

FIGURE 16 is a schematic perspective of the drive train for propelling the harvesting machine, and the drive train of the vine digging means on the front of the machine.

The general arrangement (FIGS. 1–3) of the harvesting machine 20 includes drive wheels 21 and 22, a steerable front wheel 23, and an operator's station 24 from which the driver maneuvers the machine along the rows of vines to be harvested. The machine is self-powered by an engine 25.

A vine digging, severing and gathering mechanism A (FIGS. 2 and 3) is mounted at the front end of the machine and transfers the severed vines and any fallen fruit onto an upper, upwardly inclined elevating flight 26 of a main cross slat type, combined feeder and shaker conveyor B. The upper flight 27 of a slat type drop-off conveyor C underlies part of the elevating flight 26 whereby the loose fruit, dirt and vine pieces which are too small to be supported by the shaker conveyor B become supported by the flight 27 and are discharged onto two laterally extending sorting conveyors D1 and D2. The good fruit is manually sorted from the conveyors D1 and D2 by personnel stationed beside each conveyor upon respectively associated platforms E1 and E2, and placed on a collecting and discharge conveyor K. Any fruit or debris which is not sorted from the conveyors is discharged onto the ground.

Vines, fruit and clods which do not drop through the shaker conveyor B (FIGS. 4 and 5) are conveyed rearwardly by the elevating flight 26, over a descending flight 28, and onto another upwardly inclined shaker flight 29 of the shaker conveyor B. The rearwardly moving flight 29 is reciprocated along its direction of travel to shake the vines and thus detach the fruit. The fruit freed from the vines by the shaker flight 29 drops onto the upper belt flight 30 of an undershaker drop-off conveyor F. The flight 30 conveys the fruit, plus any vine pieces and dirt which have dropped through the shaker flight 29, upwardly and rearwardly onto the upper flights 32 and 34 (FIG. 2) of laterally extending rear cross belt conveyors G1 and G2 that have their respective input end portions near the longitudinal centerline of the machine and thereby divide the fruit delivered by the undershaker conveyor F.

Each year cross conveyor G1 and G2 discharges its fruit onto the upper flight 36 or 38 of associated sorting belts H1 and H2. The flights 36 and 38 extend alongside the shaker section 26 and travel toward the front of the machine. During conveying movement of the fruit upon the sorting belts, personnel who are stationed beside each sorting belt upon platforms J1 and J2, remove all rejected fruit and foreign matter and drop it to the ground through vertical passages indicated at 40 (FIG. 2) between each sorting belt and the shaker conveyor B.

The discharge ends of the sorting belts H1 and H2 are positioned to deposit the sorted fruit onto the cross-slat type discharge conveyor K having an upper conveying flight 42. The discharge conveyor K transfers the fruit over a bridge at 43 and onto the conveying flight 44 of an associated elevator L that has a discharge end positioned above a cooperating discharge chute M. The chute M is so designed as to gently lower the fruit therethrough into a collection bin, not shown, that is carried upon an orchard truck moving along beside the harvester. Bridge 43 provides a smooth transition surface between the discharge conveyor flight 42 and the elevator flight 44, and permits the inclination of the elevator to be adjusted without impairing transfer of fruit onto the elevator.

Good fruit, as previously mentioned, which is separated from the foreign material upon the sorting conveyors D1 and D2, by the personnel on the platforms E1 and E2, is manually placed onto the discharge conveyor K. It is to be noted that all fruit which is discharged from the elevator L has traveled in front of, and has been inspected by sorting personnel in the case of both the front sorting conveyors D1 and D2 and the side sorting conveyors H1 and H2.

*Main support structure*

Figures 5, 5A, 15:
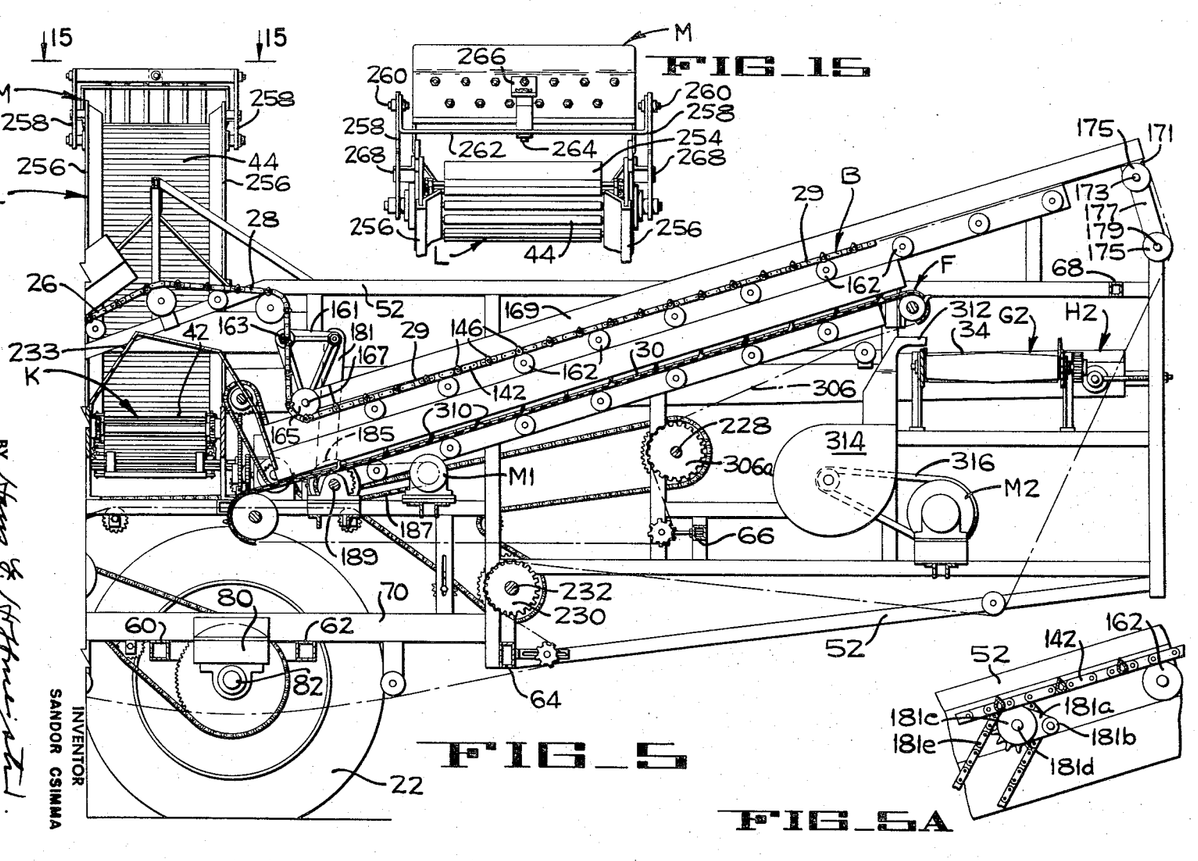
FIGURE 5 is a diagrammatic longitudinal section taken along lines 5—5 on FIGURE 2, and is drawn at the same scale as FIGURE 4.
FIGURE 5A is a fragmentary section of part of the structure shown in FIGURE 5, and is at a slightly enlarged scale.
FIGURE 15 is an enlarged fragmentary plan of the lowering chute in FIGURE 14 and is indicated by the lines 15—15 on FIGURE 5.

The frame of the harvesting machine 20 (FIGS. 1–4) is fabricated of welded tubing and includes a pair of spaced longitudinal side sections 50 and 52 which are laterally interconnected both for rigidity and for mounting various elements of the harvesting machine. Thus, the front end portions of the side sections 50 and 52 (FIG. 4) are interconnected by structural tubes 54, 56 and 58, and the central and rear portions of the frame sections, as shown in FIGURE 5, are interconnected by a plurality of structural tubes 60, 62, 64, 66 and 68. The tubes 60 and 62 are connected to a longitudinal tube 70 which mounts a bracket 80 that is provided with a stub axle 82 supporting the right wheel 22. The frame section 50 is provided with a similar stub axle 85 (FIG. 16) and bracket, not shown, which supports the left wheel 21. Both wheels 21 and 22 are driven by a power train, later described, and can be individually braked to assist the steering of the harvester by the front steerable support wheel 23.

Figures 6, 7:
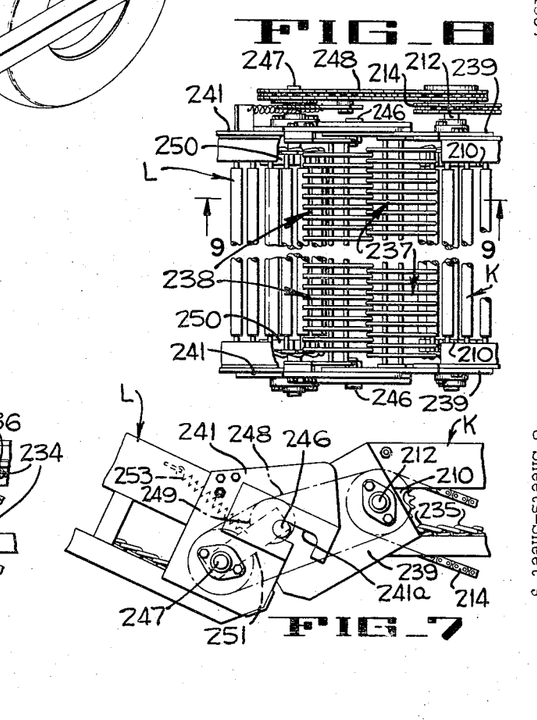
FIGURE 6 is a schematic perspective of the front left portion of the harvester frame illustrating structure for adjusting the elevation of the front end of the machine; the view is taken in the general direction of the arrow 6 on FIGURE 2.
FIGURE 7 is an enlarged schematic elevation, indicated by the arrows 7—7 on FIGURE 2, showing the pivotal connection of an elevator conveyor to a discharge conveyor.
Figure 8:
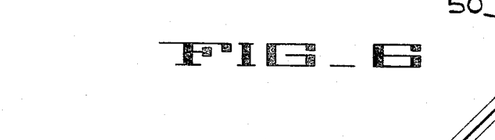
FIGURE 8 is a schematic plan, partly broken away, of the mechanism shown in FIGURE 7.

The front wheel 23 (FIG. 6) is aligned with the drive wheel 21 and is mounted in a steering yoke 88 which is pivotally connected, for steering movement about an axis 90, to the free end of a box beam 92. The other end of the beam 92 is mounted upon a horizontal pivot shaft 94 that is supported by the frame section 50 and by an outrigger beam 96 that is carried by the structural tubes 56 and 64 that are connected to both frame sections 50 and 52. An upright frame member 98 is welded to the forward end of the outrigger beam 96. A driver's platform 100, which forms the floor of the operator's station 24, extends laterally inward from the frame member 98 and lies above the box beam 92. Interposed between a bracket 101 on the driver's platform 100 and the box beam 92 is a double acting hydraulic ram 102 which, when its piston rod is extended or retracted, pivots the beam 92 about the pivot shaft 94 and thus changes the relative positions of the beam 92 and the frame sections 50 and 52. The front end of the harvesting machine 20 is thereby vertically adjusted so that the position of the digging mechanism A relative to the ground is maintained at a selected elevation, either for optimum digging action, or for ground clearance during movement of the harvester to and from the fields.

A hydraulic ram 104 is connected between the beam 92 and the steering yoke 88 and is controlled by a valve, not shown, which is in turn actuated by a steering wheel 106 at the operator's station 24. In addition to the power steering action of the ram 104, the drive wheels 21 and 22 (FIG. 2) can be individually braked by means of associated brake pedals 108, 110 and the harvester can thereby be maneuvered in close quarters by driving one of the drive wheels faster than the other.

*Digging mechanism*

The vine digging and gathering mechanism A (FIGS. 1–3) is unchanged in its general construction, operation and arrangement from the digging and gathering mechanism disclosed in the above-identified pending patent application. Thus, the mechanism A includes counter-rotating steel digging discs 120 and 122 that are positioned ahead of the shaker conveyor elevating flight 26, and cooperating corrugated pickup belts 124 and 126 which are respectively associated with the discs; the inner flights of the pickup belts move rearwardly to deposit the vines, plus any loose fruit, on the elevating flight 26 of the shaker conveyor B. Upright shafts 128 and 130, respectively, support the discs 120 and 122 and are driven in a manner to be described.

*Shaker and drop-off conveyors*

Figures 10, 11, 12, 13, 14:
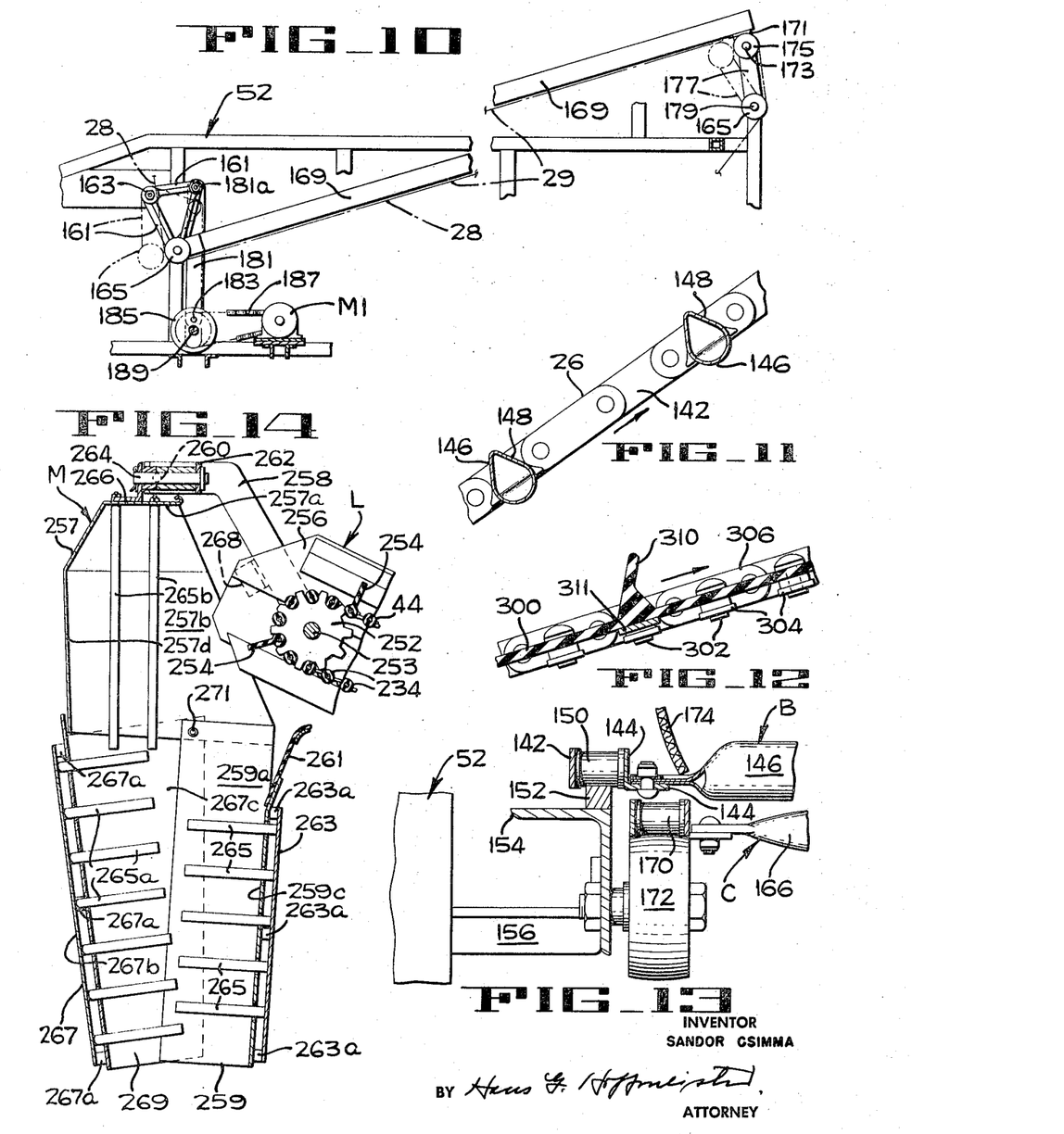
Figure 15:
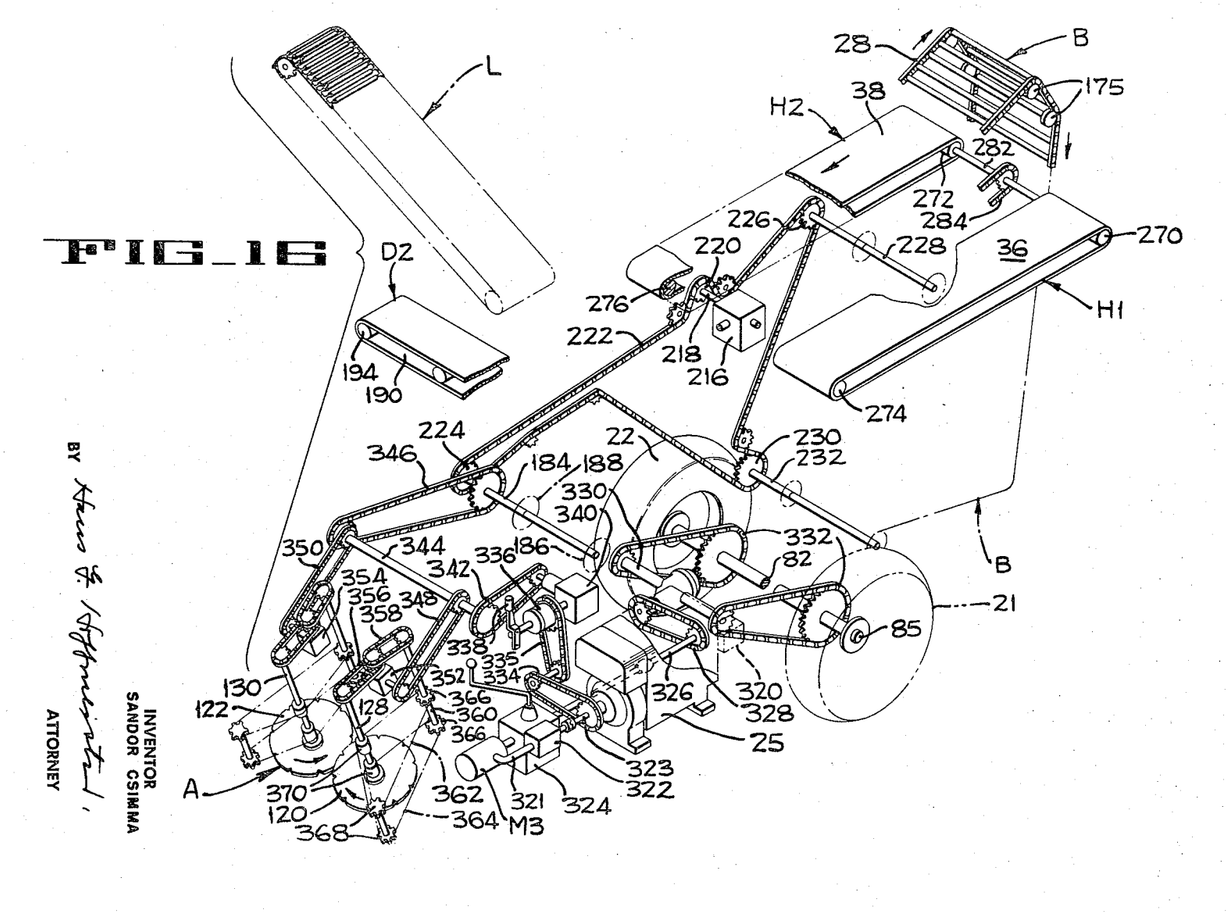
Figure 17:
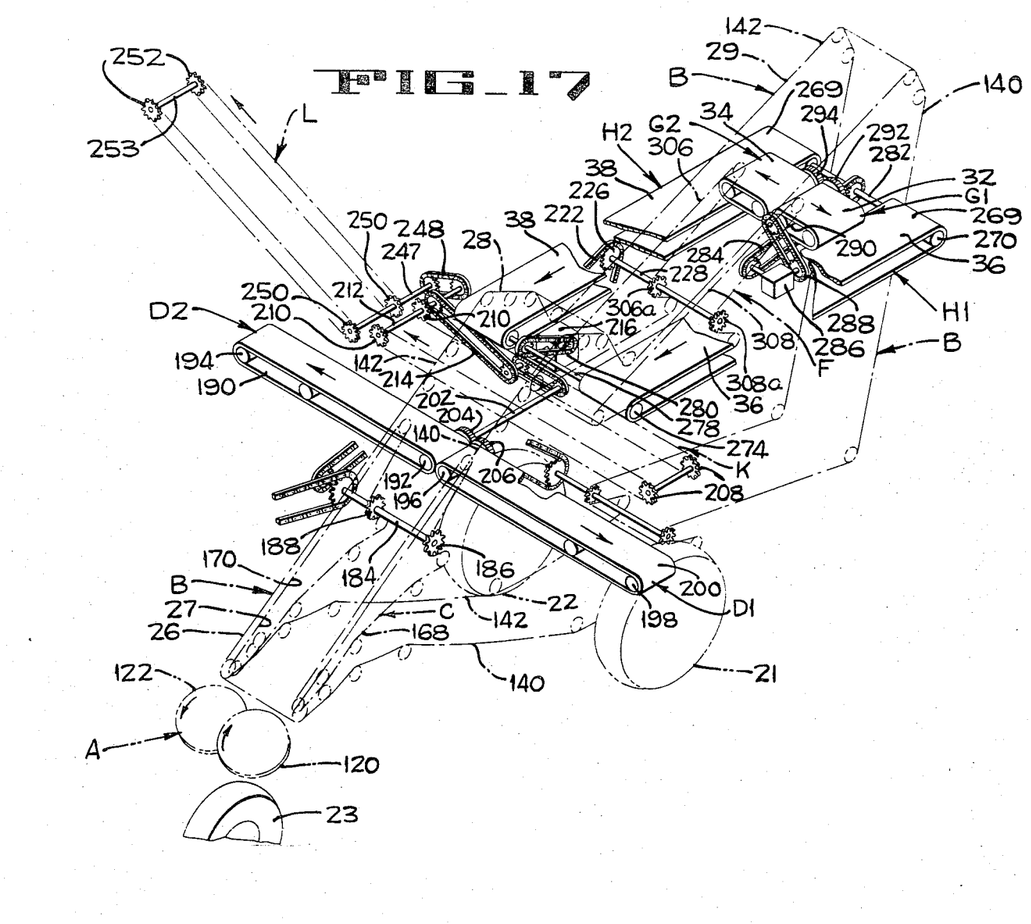
FIGURE 17 is a schematic perspective, similar to FIGURE 16 but at a slightly reduced scale, and particularly shows the drive train for the various fruit and vine conveyors of the harvesting machine.

The shaker conveyor B (FIGS. 4, 5 and 17) comprises laterally spaced endless roller chains 140 and 142 which are each provided with spaced attachment links 144 (FIG. 13) carrying hollow cross bars 146. The cross bars are approximately tear-drop or wedge-shaped in cross section so that the leading surface 148 (FIG. 11) of each bar presents a broad edge that inhibits the tendency of vines and tomatoes to roll back down the relatively steep initial elevating flight 26 of the shaker conveyor.

The rollers 150 (FIG. 13) of the upper flight of the chain 142 are supported near the front right side of the machine by a wear strip 152 (FIG. 13), and the chain 140 at the left side of the machine is similarly supported. The wear strip 152 is mounted on supports comprising a coextensive angle bar 154 and a plurality of angle bars 156, only one being shown, that secure the bar 154 to the frame section 50. Adjacent the drive wheel 22 (FIG. 5) the chain 142 is trained over a drive sprocket 230, that will be mentioned later. Also, the elevating flight 26 (FIG. 4) of the shaker conveyor B extends upward from an idler disc 180 that is also later mentioned in conjunction with the drop-off conveyor C.

The shaker flight 29 (FIG. 5) of the shaker conveyor B is reciprocated back and forth, to jar the fruit from the vines, while it continues being driven toward the rear of the machine. Such reciprocation is effected by a similar mechanism at each side of the machine. At the right side, a crank 161 is pivoted to the frame section 52 by a pivot bolt 163 and carries a roller 165 around which the chain 142 is trained. A shaft 167 carries the roller 165 and projects through the front end portion of a longitudinal tie bar 169. The rear end portion of the tie bar 169 is provided with a depending bracket 171 which carries a shaft 173 having a roller 175 mounted thereon. Roller 175 supports the discharge end of the shaker flight 29, and in turn is carried by an upright arm 177 which is held by a pivot rod 179 to another roller 175 and to the frame section 52.

The crank 161 (FIGS. 5 and 10) is swung about the pivot bolt 163 by a drive arm 181 that is pivoted at 181a to the crank. Arm 181 has a pivotal, eccentric connection at 183 to a drive disc 185 which is driven by a chain and sprocket arrangement 187 connected to the drive disc and to a hydraulic motor M1. The disc 185 is secured to a shaft 189 that extends across the machine and drives another disc, not shown, for the similar reciprocating mechanism at the left side of the machine. When the motor M1 is energized during operation of the harvesting machine 20, the crank 161 and the arm 177 swing between their full line and dotted line positions illustrated in FIGURE 10 and consequently reciprocate the rearwardly moving shaker flight 29 of the shaker conveyor B fore and aft and shake the fruit from the vines. The motor M1 can be throttled by means of a valve, not shown, whereby the oscillation frequency of the shaker flight 29 can be adjusted to produce the optimum result.

The frequency control feature is important because it has recently been discovered that the great majority of tomato varieties can be successfully removed from their vines by controlling the shaker oscillation frequency. Previously it was believed more important to be able to vary the amplitude of oscillation; insofar as is known, the use of variable frequency shaker oscillations of fixed amplitude attains a new result contrary to, or at least unobvious from, the teachings of the prior art. Since the operator can vary the shaker frequency while the harvester is in operation, the efficiency of the shaker can be observed under actual operating conditions and can thus be adjusted for maximum efficiency. It is to be emphasized that shaker frequency control is important because the forces involved in separating the vines and tomatoes can vary considerably from field to field due to plant growing conditions, variety and so forth.

Although perhaps not required in all cases, an additional shaking action of the shaker flight 29 may be employed when it is expected that very firmly attached tomatoes, or bundles of heavy vines, or compacted or compressed vines or vines piled deeply on the conveyor B, will be encountered. Such action is most effectively carried out by a shaker drive arm 181a (FIG. 5A). Arm 181a is provided with a roller 181b on its free end and a hub 181c. The hub is secured to a stub shaft 181d that is pivotally mounted to the frame section 52 and is provided with a chain and sprocket drive 181e (partly broken away) to the driven shaft 189 (FIG. 5). The hub 181c and the roller 181b lie in a vertical plane including the shaker chain 142 whereby the roller successively lifts the chain 142 and drops it onto the hub. The chain is thus rapidly arrested and causes a severe jar to the vines supported by the shaker flight. This jarring, plus the longgitudinal reciprocation of the shaker flight 29, is effective to detach tomatoes which would otherwise remain attached to, and discharged with, the vines conveyed over the rear end portion of the shaker flight onto the ground. It will be apparent that multiple vertical shaker units can be used along the shaker flight 29, and that the shaker chain 140 at the other side of the machine is provided with a vertical shaker mechanism similar to the one illustrated and described.

The drop-off conveyor C (FIGS. 4, 13 and 17) is provided with lateral tubular bars 166 which are spaced closer than the pitch distance of the shaker cross bars 146 so as to support any material which is too small to be supported by the shaker conveyor. The ends of each bar 166 are riveted to endless roller chains 168 and 170. Various runs of the chain 170 are suported by and are trained around, freely rotatable rollers 172. Chain 170 is also trained over a drive sprocket 188 that is mentioned later; a similar drive sprocket 186 (FIG. 17) is provided for the chain 168 as well as support rollers corresponding to the rollers 172.

Since the flight 27 of the drop-off conveyor C and the adjacent shaker elevating flight 26 handle dirt, stones and other debris, the rollers 172 reduce wear of the chains 140, 142, 168 and 170 because the rollers will not entrap foreign matter that might otherwise work into the links and rollers of the chains. In order to inhibit foreign matter handled by the elevating flight 26 from contacting the above mentioned chains, a flexible guard flap 174 (FIGS. 4 and 13) is secured to a member 175 that is fixed to the frame section 52. The flap has a lower end portion which lies inward of the chain 142. A similar guard flap 176 (FIG. 1) shown broken away, is provided for the opposite chain 140. To further reduce wear of the shaker conveyor and drop-off conveyor chains, the chains 142 and 170 (FIG. 4) are respectively trained around rotatable idler discs 180 and 182 near the vine digging mechanism A so as to eliminate sprocket teeth which would tend to jam dirt and debris into the space between adjacent rollers of the chains.

Drive means for the drop-off conveyor C (FIGS. 4 and 17) include a driven shaft 184 and the sprockets 186 and 188 which are secured to the shaft 184 and are meshed with the chains 168 and 170. Drive means for the shaker conveyor B includes the same driven shaft 184, which has a sprocket 224 (FIG. 16) secured thereto and a roller drive chain 222 which interconnects shaker drive sprocket 230 and sprocket 224.

Both the shaker and drop-off conveyors B and C are driven at the same lineal speed. Shaft 184 also provides power for the digging discs 120 and 122 and its drive connections to the engine 25 will be presently described with the primary drive train.

*Front sorting and discharge conveyors*

The front sorting conveyor D2 (FIGS. 4 and 17) includes an endless flexible belt 190, which is trained around a drive roller 192 and an idler roller 194, and braces and support structure which mount the conveyor in a fixed position projecting outward through the frame section 52. The inner looped end of the belt 190 is adjacent the longitudinal centerline of the shaker conveyor B whereby the sorting conveyor D2 intercepts approximately half of the loose fruit and other material which is not retained upon the shaker conveyor B. Similarly, the front sorting conveyor D1 (FIG. 2), which is aligned with conveyor D2, projects outward through the frame section 50 (FIG. 1) and includes a drive roller 196 (FIG. 17), an idler roller 198 and an endless flexible belt 200 which is trained around the rollers.

The drive roller 192 for conveyor D2 is mounted on a driveshaft 202 which is provided with a gear 204. The gear 204 is meshed with a gear 206 that is coupled to the drive roller 196 so that the upper flights of the belts 190 and 200 simultaneously move in opposite, outward directions.

The discharge conveyor K (FIGS. 5 and 17) includes a pair of idler sprockets 208 supported at the left side of the machine and a pair of drive sprockets 210 mounted at the right side of the machine on a shaft 212. A chain and sprocket drive arrangement 214 connects the shaft 212 to a gear box 216 which is provided with a power input shaft 218 (FIG. 16) having a sprocket 220 that is meshed with the drive chain 222. The drive chain 222 is trained around a sprocket 226 that is secured to a driveshaft 228 for powering the undershaker conveyor F, and over the sprocket 230 to power an associated driveshaft 232 for the shaker conveyor B.

In order to prevent material from dropping onto the discharge conveyor K from the shaker conveyor B, a sheet metal guard 233 (FIG. 5) extends over the discharge conveyor K and has sloping walls which will direct any such material onto the sorting conveyors D1 or D2, or onto the undershaker conveyor F.

Figure 9:
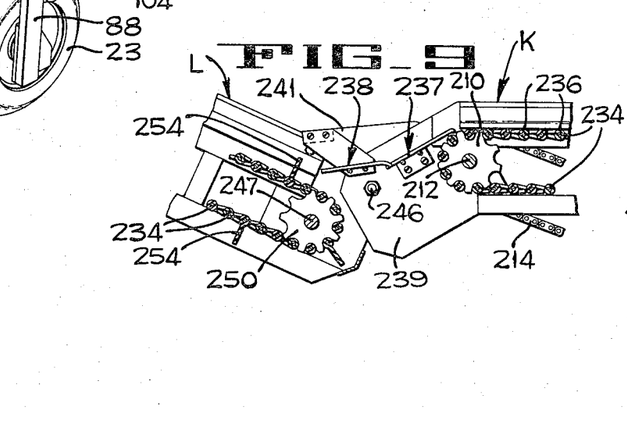
FIGURE 9 is a section taken along lines 9—9 on FIGURE 8.

Returning now to the discharge conveyor K (FIGS. 7–9 and 17), the drive and idler sprockets 210 and 208 are meshed with an endless flight which includes the elevating flight 44 and comprises lateral rods 234 having intertwined end portions 235 and resilient rubber sheaths 236. At its right-hand or discharge end, the discharge conveyor K is provided with a fixed grid 237 comprised of spaced rods which intermesh with the rods of a similar grid 238 that is mounted on the input end of the elevator. L. The grids 236 and 238 are respectively secured to associated pairs of side plates 239 and 241 of the discharge conveyor K and the levator L and form a transition surface or bridge between the discharge conveyor K and the elevator L to gently guide and support the fruit regardless of the inclination of the elevator. As best shown in FIGURE 9, the input end of the elevator L is lower than, and is spaced from, the discharge end of the discharge conveyor K so as to form a fruit accumulating area that prevents fruit from blocking the discharge conveyor if the fruit is not immediately carried away by the elevator.

Figure 1:
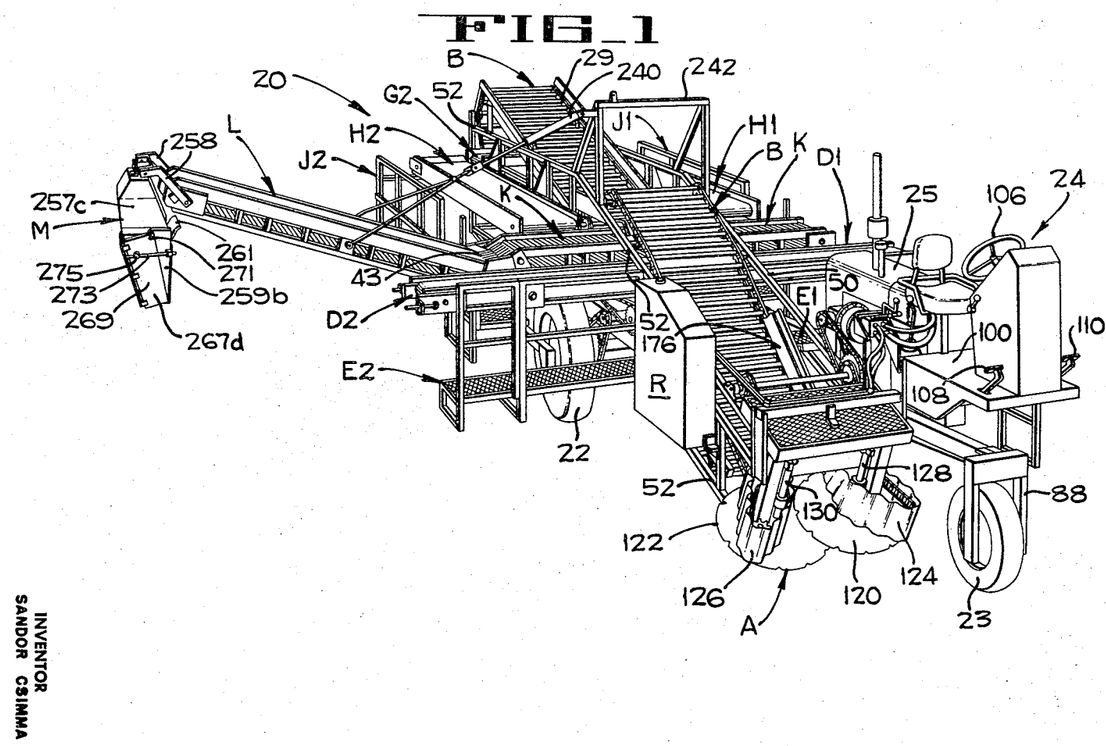
FIGURE 1 is a diagrammatic prespective of the harvesting machine of the present invention viewed from its front end.

The inclination of the elevator L is selected by the manipulation of a valve, not shown, which governs a hydraulic cylinder 240 (FIG. 1). The cylinder interconnects a superstructure frame 242 and a yoke 244 that is secured to the elevator L. When the piston rod of the cylinder 240 is extended or retracted, the elevator L pivots about a pair of studs 246 (FIGS. 7–9) that are bolted to the associated side plates 239 of the discharge conveyor K and are engaged by slotted portions, as shown at 241a for one of the elevator side plates 241.

The driveshaft 247 (FIGS. 7–9 and 17) of the elevator L has a chain and sprocket drive connection 248 to the previously mentioned shaft 212. Since the elevator pivot studs 246 are not coincident with the discharge conveyor driveshaft 212, the distance between shaft 212 and the elevator driveshaft 247 changes when the elevator inclination is changed. Accordingly, the chain and sprocket connection 248 incorporates a resiliently mounted idler sprocket 249 which is mounted on an arm 251 that pivots on the driveshaft 247. The arm is urged upward by a tension spring 253 to keep the chain taut. It will be seen that the chain of the chain and sprocket drive connection 248 for the elevator L can be easily removed without tools and that the pin and slot connection 241a of the elevator to the discharge conveyor K can be uncoupled without tools; the elevator can thus be readily removed for facilitating shipping of the machine if, for example, it operates in widely separated fields.

Further features contributing to the portability of the harvesting machine 20 (FIGS. 1 and 2) are that the outboard end portions of the worker's support platforms E1 and E2 are removable and that the outer ends of the front sorting conveyors D1 and D2 can be folded down. Both of these features are accomplished by the use of ordinary mechanical expedients and hence are not specifically illustrated or described in detail.

Discharge chute

Each side member 256 (FIGS. 5, 14, and 15) of the elevator L is associated with a chute support arm 258; the two arms are pivotally mounted on the idler shaft 253 and mount aligned pivot shafts 260 which project inwardly through the ends of a U-shaped bar 262. The bar 262 is provided with a central pivot shaft 264 that is perpendicular to the axes of the pivot shafts 260, and which projects through a bracket 266 that is welded atop the discharge chute M. The discharge chute is thus mounted for universal swinging movement from the elevator, and since it depends from the elevator will remain upright regardless of any usual degree of inclination of the elevator. Each chute support arm 258 normally rests upon an associated stop block 268 that is secured to the adjacent side plate 256. However, if the elevator should be lowered so far that the chute M strikes some obstruction, the arms 258 will pivot away from the stop blocks 268 and thereby prevent damage to the chute M.

The chute M (FIG. 14) comprises an upper enclosure 257 which may be formed of sheet metal, belting material or other suitable material. The enclosure is provided with a top wall 257a, side walls 257b and 257c, a rear wall 257d, an open side facing the elevator L, and an open lower end, Rigidly attached to the enclosure 257 is a depending, generally U-shaped guide 259 having side walls 259a and 259b, and an inner wall 259c. An outwardly inclined resilient guide flap 261, which lies beneath the discharge end of the elevator, is attached to the upper end of the wall 259c. A removably attached plate 263 is secured by tabs 263a to the side walls 259a and 259b, and plate 263 is provided with a plurality of resilient flexible fingers 265. The fingers 265 may be molded of rubber with integral bolts, not shown, at one end for attachment to the plate 263, or may simply comprise lengths of rubber hose or tubing screwed onto the inwardly projecting shanks of bolts, not shown, inserted through apertures in the plate 263. In either case, substantially the entire length of each finger is free to flex. The fingers extend through corresponding apertures in the guide 259 and coact with opposed resilient fingers 265a to cushion and retard the fall of fruit. The fingers 265a are secured to a mounting plate 267 that is removably secured by tabs 267a to a pivotable, generally U-shaped guide 269 having an outer wall 267b, side walls 267c and 267d, and a pivot connection at 271 to each side wall of the enclosure 257. A locking rod 273 (FIG. 1), only one being shown, is secured to each side of the guide 259 and projects through a thumb screw lock 275 which is secured to the pivotable guide 269. By adjusting the guide 269 about its pivot 271, the lower end discharge throat of the discharge chute M can be made larger or smaller, and the impeding action of the resilient fingers 265 and 265a can be increased or reduced by causing more or less of the fingers to intermesh. The removable mounting plates 263 and 267 provide for repair or replacement of the resilient fingers 265 and 265a. Other resilient fingers 265b depend from the upper wall of the enclosure 257 so as to prevent the fruit from being projected by the elevator conveyor against the rear wall of the enclosure. The discharge chute M provides a gentle lowering action for the relatively fragile fruit which would otherwise be damaged because the field bins into which the fruit is loaded are about four feet deep.

Side sorting and rear cross conveyors

The side sorting conveyors H1 and H2 (FIGS. 16 and 17) are each formed of flexible, resilient-surface belting 269 respectively trained around idler pulleys 270, 272 and drive pulleys 274, 276. The drive pulleys 274, 276 are mounted on a common driveshaft 278 that is provided with a chain tnd sprocket drive connection 280 to the gear box 216. Idler pulleys 270 and 272 are fixed on a common shaft 282 which is driven by the sorting conveyor belts H1 and H2. A sprouket and chain drive connection 284 connects shaft 282 to a gear box 286 which has a drive chain 288 to a belt roller 290 that drives the left rear cross conveyor G1. A gear 292, which is coupled to the roller 290, is meshed with a gear and roller combination 294 that drives the right rear cross conveyor G2. Both rear cross conveyor belts have resilient facings, and are driven in opposite directions so that the upper flights 32 and 34 move outward to deposit fruit upon the sorting conveyors H1 and H2.

Undershaker conveyor

As best shown in FIGURE 5, the undershaker conveyor F extends under the major portion of the length of the shaker conveyor flight 29 and comprises an endless rubber and fabric belt 300 (FIG. 12) which has its right hand marginal edge secured by rivets 302 to chain attachment links 304 carried by a roller chain 306. By similar attachment means, the belt 300 is secured to a roller chain 308 (FIG. 17) at the left side of the machine, and spaced pusher lugs 310 (FIGS. 5 and 12) are integrally molded across the width of the belt. Each pusher lug 310 is as wide as the belt 300. The chains 306 and 308 are trained around drive sprockets 306a and 308a that are secured to the shaft 228. Each pusher lug lies above a metal reinforcing strap 311 which is also riveted to the chains 306 and 308. It will be noted that the upper, discharge end of the belt 300 is spaced above the plane of the conveying flights of the rear cross conveyors G1 and G2. The discharge throat 312 (FIG. 5) of a blower 314 is positioned between the upper end of the undershaker conveyor F and the confronting end portions of the rear cross conveyors G1 and G2. The throat 312 is as wide as the undershaker conveyor F so that any material lighter than the fruit delivered by the undershaker conveyor is blown off the cross conveyors. A hydraulic motor M2 and a belt and pulley drive 316 power the blower 314, and a conventional valve, not shown, is connected to the fluid supply line for the motor M2 whereby the speed of the motor can be controlled to produce the desired air blast velocity from the blower.

*Primary drive train*

The engine 25 (FIGS. 1, 2 and 16) is mounted atop the outrigger beam 96 (FIG. 6) ahead of the drive wheel 21. Coupled to the engine, for powering the hydraulic motors M1 and M2, and the rams 240, 104, and 102, is a hydraulic pump 320. The pump is in a conventional hydraulic circuit, not illustrated, including a hydraulic fluid reservoir R (FIGS. 1 and 2) that is mounted on the frame section 52. The various control valves for the hydraulic circuit are mounted adjacent the driver's steering wheel 106. A third hydraulic motor M3 (FIG. 16) is driven by fluid transferred through a pressure line 321 from a hydraulic pump 322 which is coupled to a shaft 323 of the engine 25. The motor M3 is coupled to an automotive type of transmission 324 whereby the output shaft 326 of the transmission is capable of a wide range of speeds by varying the speed of the hydraulic motor M3 and by shifting the transmission gears into a selected drive ratio. A chain and sprocket drive 328 interconnects the transmission output shaft 326 and a differential axle 330 which is provided with individual chain and sprocket drive trains 332 to the drive wheels 21 and 22.

The engine shaft 323, by means of chain drive couplings 334 and 335, powers a clutch 336 which can be engaged or disengaged by an operating handle 338. The clutch is coupled to a gear box 340 having a chain drive coupling 342 to a jackshaft 344 from which power is transmitted to the shaft 184 by a chain drive coupling 346 in order to power the conveyors B, C, D1, D2, F, G1, G2, H1, H2, K, and L. The jackshaft 344 has chain and sprocket drive connections 348 and 350 to gear boxes 352 and 354, respectively, which power the digging discs 120 and 122 and their associated pick-up belts 124 and 126 (FIG. 1) of the vine digging and severing mechanisms A. Thus, the mounting shaft 128 for the digging disc 120 has a chain drive connection 356 to the gear box 352, and a chain drive connection 358 transfers power from the gear box 352 to a shaft 360 for driving the pick-up belt 124 (FIG. 1). The pick-up belt 124 is carried by chains 362 and 364, shown in pitch lines in FIGURE 16, that are trained around sprockets 366 on the shaft 360, around idler sprockets 368, and around sleeves 370 on the disc mounting shaft 128. The other pick up belt 126 and disc 122 are driven by a separate drive train which parallels the construction of the drive train for the pick-up belt 124 and disc 120.

*Operation*

The harvesting machine 20 is positioned so that the row of vines, for example tomato vines, to be harvested coincides with the longitudinal centerline of the shaker conveyor B, and a truck, not shown, is moved alongside with its fruit collection bin under the discharge chute M. Preferably, three sorting personnel are stationed upon each front sorting conveyor platform E1 and E2, and six sorting personnel are stationed upon each side sorting conveyor platform J1 and J2. The ram 102 (FIG. 6) is adjusted by the driver of the harvesting machine so that the vine digging discs 120 and 122 are at the desired elevation, and the clutch 336 (FIG. 16) is engaged to drive the digging discs and conveyors B, C, D1, D2, F, G1, G2, H1, H2, K and L. Both vehicles are then driven forward at the same speed. The digging discs 120 and 122 sever the vines slightly below the surface of the ground and, in conjunction with the pick-up belts 124 and 126, transfer the vines rearwardly onto the shaker conveyor elevating flight 26 (FIG. 4) together with a thin layer of dirt, clods, and any loose tomatoes that may have been lying on the ground.

Figure 2:
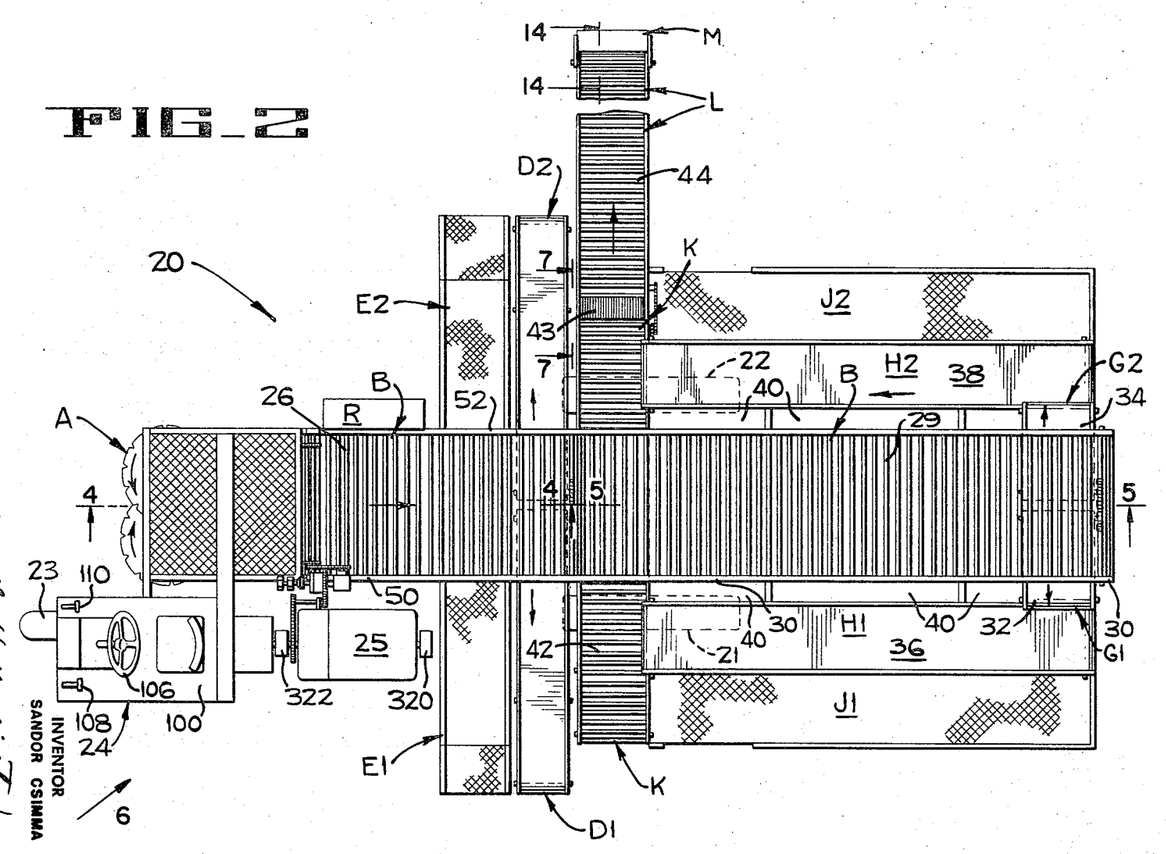
FIGURE 2 is a diagrammatic plan of the over-all harvesting machine and particularly illustrates the flow path of the harvested fruit and the arrangement of platforms which support personnel who sort the harvested fruit.
Figures 3, 4:
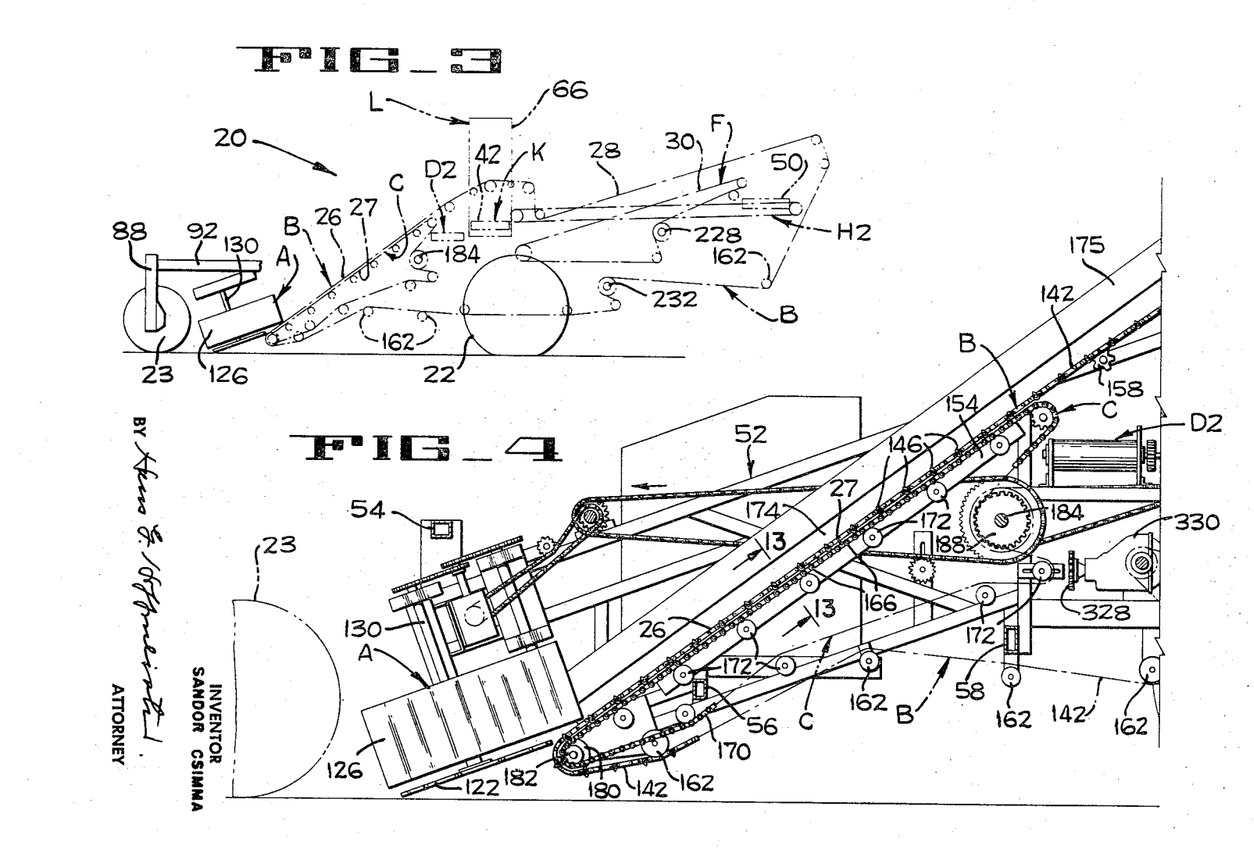
FIGURE 3 is a diagrammatic longitudinal section particularly illustrating the conveyor system of the harvester.
FIGURE 4 is a diagrammatic longitudinal section taken along lines 4—4 on FIGURE 2, and is at an enlarged scale.

The loose tomatoes, clods and other material which are smaller than the spaces between the shaker conveyor bars 146, but larger than the spaces between the bars 166, are supported by the drop-off conveyor bars 166 until such conveyed material overlies the front sorting conveyors D1 and D2 (FIG. 2). The material which is then unsupported drops onto the front sorting conveyors. The front sorting conveyors move this material laterally outward past the sorting personnel, stationed upon the platforms E1 and E2, who remove only the good fruit and place it upon the discharge conveyor K. The rejected material remaining upon the front sorting conveyors is discharged from these conveyors onto the ground. Thus, substantially all of the material to be sorted from the good fruit and remaining upon the shaker conveyor B rearwardly of the front sorting conveyor platforms E1 and E2, will be, besides the vines, an occasional dirt clod or stone which is larger than the space between the shaker conveyor bars 146.

As the vines and attached fruit are conveyed by the shaker conveyor B over the sorting conveyors D1 and D2, and over the discharge conveyor K, some tomatoes may become detached and fall. The guard 233 (FIG. 5) intercepts these tomatoes and causes them to roll either onto the front sorting conveyors D1 and D2, or onto the under-shaker conveyor F. In either case the fruit cannot be discharged from the harvesting machine without first being inspected by the sorters stationed on the platforms E1 and E2, or by the sorters stationed on the platforms J1 or J2. After the vines on the shaker conveyor B pass the descending flight 28 between the elevating flight 26 and the shaker flight 29, they are subjected to a vigorous shaking by the fore and aft reciprocation of the shaker flight while they continue their rearward movement. The frequency of the reciprocating movement is adjusted as required by throttling the motor M1 whereby the optimum shaking movement can be obtained for the particular vines being harvested. The shaking causes the tomatoes to become detached, and thus unsupported, whereby the tomatoes drop through the spaces between the shaker bars 146 onto the under-shaker conveyor F. The resilient pusher lugs 310 inhibit the tendency of the tomatoes to roll down the conveyor F so that the fruit comes to rest between adjacent pusher lugs and is conveyed upwardly and rearwardly toward the rear cross conveyors G1 and G2. Some leaves, vine pieces and so forth also drop from the shaker conveyor B onto the under-shaker conveyor F; as soon as the fruit and this foreign material drops from the upper end of the under-shaker conveyor F, the air blast emanating from the blower 314 blows away material which is lighter than the smallest fruit being retained. The rear cross conveyors G1 and G2 thus primarily retain only fruit to be sorted, and respectively discharge the fruit onto the side sorting conveyors H1 and H2 for conveyance back toward the discharge conveyor K past the sorters stationed upon the support platforms J1 and J2.

The twelve sorting personnel for the side sorting conveyors J1 and J2 remove all but the good fruit from the side sorting conveyors H1 and H2, and deposit all other fruit and debris, if any, onto the ground through the vertical passages at 40 (FIG. 2). Thus, the fruit which is discharge from the sorting conveyors H1 and H2 onto the discharge conveyor K has traveled in front of, and has been inspected by, at least six sorters. The fruit on conveyor K is discharged over the bridge 43 and onto the lower end of the elevator L. From the upper end of the elevator the fruit is projected into the discharge chute M which is positioned over, or within, a collection bin on the truck which is travelling beside the harvester. The resilient fingers 265, 265a and 265b within the chute M retard the fall of the tomatoes and prevent their impinging the walls of the chute whereby the tomatoes are transferred from the harvester without damage.

The harvesting machine of the present invention is designed to process fruit at rates in the order of fifteen tons per hour, a rate which has previously been difficult to achieve and sustain not only because of mechanical limitations of the prior apparatus, but because such a large volume of fruit could not be efficiently handled without an inordinately large machine. Thus, one important feature of the invention concerns the particular organization and arrangement of the components of the harvesting machine 20 which cooperatively produce heretofore unobtainable high production rates in a relatively compact machine which can thus materially reduce the cost of the harvested fruit. Further, the variable frequency feature of the shaker flight 29 permits adjustment of the shaker while the machine is operating and the results can be visually checked. The particular wedge-shaped cross section of the shaker conveyor bars 146 permits a relatively steep yet efficient elevator flight 26 so that the flight need not be unduly long. The infinitely variable hydraulic-mechanical drive including the motor M3 and transmission 324 for the driving wheels 21 and 22 is also important in regulating the ground speed of the harvester to the special requirements of each harvesting site without affecting the speed of the fruit and vine handling means. The discharge chute M is also of special importance in the attainment of the high propduction rates mentioned since its efficiency has a considerable effect on the overall result of the harvesting, sorting and unloading operations. It is also worthy of mention that the sorting personnel work with the same motion, i.e., away from their stations. This latter feature makes it less difficult to periodically change the sorters to different work stations whereby they are subject to less fatigue and work more efficiently.

It has been found that the harvesting machine of the present invention has performed more efficiently than have manual picking operations insofar as the percentage of damaged and thus rejected fruit is concerned. The crop yield accordingly, is increased by the harvesting machine 20 over the yield normally expected of manual picking operations.

Having thus described the invention, that which is believed to be new and for which protection by the issue of Letters Patent is desired is:

1. A vine crop harvesting machine comprising means for gathering vines and fruit along with entrained dirt and fallen fruit, a shaker conveyor arranged to receive and convey the fruit, dirt and vines along a predetermined path, a front sorting conveyor arranged to receive loose dirt and fruit from said shaker conveyor and to convey the fruit and dirt along a path transversely related to said predetermined path, a work platform adjacent said front sorting conveyor, an undershaker conveyor located downstream of said front sorting conveyor and arranged to receive the loose fruit from said shaker conveyor and convey the fruit in a direction toward the discharge end of said shaker conveyor, a discharge conveyor arranged to receive and convey sorted fruit along a path beside the conveying flight of said front sorting conveyor, a side sorting conveyor mounted at one side of said shaker conveyor for conveying the fruit in a direction counter to the direction of movement of the conveying flight of said shaker conveyor, and means for transferring fruit from said undershaker conveyor onto said side sorting conveyor, the downstream end of the conveying flight of said side sorting conveyor being arranged to discharge the sorted fruit onto said discharge conveyor.

2. A vine crop harvesting machine comprising means for gathering vines and fruit along with entrained dirt and fallen fruit, a shaker conveyor arranged to receive and convey the fruit, dirt and vines along a predetermined longitudinal and substantially horizontal path, said shaker conveyor including a reciprocating shaker flight for agitating the vines to loosen the fruit attached thereto, a front sorting conveyor arranged to receive loose dirt and fruit from said shaker conveyor at a location upstream of said shaker flight and to convey the fruit and dirt along a substantially horizontal path perpendicular to said longitudinal path, a work platform adjacent said front sorting conveyor, an undershaker conveyor arranged to receive the loose fruit from said shaker flight and convey the fruit toward the discharge end of said flight, a discharge conveyor interposed between said shaker flight and said front sorting conveyor and arranged to receive and convey sorted fruit along a path substantially parallel to the conveying flight of said front sorting conveyor, a side sorting conveyor mounted at one side of said shaker conveyor for conveying the fruit in a direction counter to the direction of movement of the fruit and vines on said shaker conveyor, means for transferring fruit from said undershaker conveyor onto said side sorting conveyor, and a work platform adjacent said side sorting conveyor, the downstream end of said side sorting conveyor being arranged to discharge the sorted fruit onto said discharge conveyor.

3. A vine crop harvesting machine comprising means for gathering growing vines and fruit along with entrained dirt and fallen fruit, a shaker conveyor arranged to receive and convey the fruit, dirt and vines along a predetermined longitudinal path, said shaker conveyor including a reciprocating shaker flight for agitating the vines to loosen the fruit attached thereto, first and second sorting conveyors arranged to receive loose dirt and fruit from said shaker conveyor at a location upstream of said shaker flight and to convey the fruit along opposed lateral paths relative to said longitudinal paths, a worker's platform mounted adjacent each of said first and second sorting conveyors, an undershaker conveyor arranged to receive the loose fruit from said shaker flight and convey the fruit toward the discharge end of said flight, a discharge conveyor mounted beneath the conveying flight of said shaker conveyor and located intermediate said shaker flight and said first and second sorting conveyors, said discharge conveyor being arranged to receive and convey loose sorted fruit laterally in the direction of movement of the conveying flight of one of said sorting conveyors, third and fourth sorting conveyors located one at each side of said shaker conveyor for conveying the fruit in a direction counter to the direction of movement of the conveying flight of said shaker conveyor, means for transferring substantially half the fruit from said undershaker conveyor onto said third and fourth sorting conveyors, and a worker's platform adjacent each of said third and fourth sorting conveyors, the downstream ends of the conveying flights of said third and fourth sorting conveyors being arranged to discharge the sorted fruit onto said discharge conveyor.

4. A harvesting machine comprising a frame; means mounting the frame for earth traversing movement relative to vines and associated fruit; a loose fruit conveyor mounted on the frame and extending transversely of the path of movement of the frame; a worker's platform positioned alongside of the loose fruit conveyor; a collecting conveyor mounted on the frame and extending alongside of the loose fruit conveyor on the opposite side thereof from the platform; a sorting conveyor extending lengthwise of the frame having a discharge end adjacent to the collecting conveyor and a receiving end relatively remote from the collecting conveyor; and vine and fruit handling means on the frame for gathering vines and fruit, for conveying them over said loose fruit and collecting conveyors and alongside of said sorting conveyor; said fruit handling means having means for dropping dirt and loose fruit onto the loose fruit conveyor to prevent further handling of the loose fruit, means for thereafter separating attached fruit from the vines, and means for depositing said separated fruit onto said collecting conveyor.

5. The machine of claim 4, wherein a second worker's platform is mounted on the frame alongside of the sorting conveyor and on the opposite side thereof from said fruit handling means, and wherein said sorting conveyor is spaced from said fruit handling means to provide an opening through which unwanted material on the sorting conveyor can be deposited onto the ground.

6. The machine of claim 4, wherein said fruit handling means comprises a main conveyor that extends over said loose fruit and collecting conveyors and alongside of said sorting conveyor, a drop off conveyor underneath only that portion of the main conveyor which extends alongside of said sorting conveyor, and a cross conveyor extending from the discharge end of the drop off conveyor to the receiving end of the sorting conveyor.

7. The harvesting machine of claim 6, wherein a shield is mounted on the frame for precluding direct discharge of fruit from said main conveyor onto the collecting conveyor and instead guiding such fruit to the loose fruit conveyor and to the drop off conveyor.

8. A tomato harvester of the type wherein vines and tomatoes are gathered onto feeder conveyor means and conveyed over shaker conveyor means for detaching tomatoes from the vines, the vines are carried off by the shaker conveyor means, the tomatoes thus detached are transferred to longitudinally running sorting belt means, a platform is disposed at said sorting belt means for accommodating manual removal of cull tomatoes from said sorting belt means, and collecting conveyor means including a lateral run are provided for receiving tomatoes remaining on said sorting belt means; the improvement comprising means for dropping off clods and loose tomatoes from said feeder belt means while transferring vines and their attached tomatoes onto said shaker conveyor means, conveyor means for receiving the clods and loose tomatoes from said feeder belt means and comprising a laterally running sorting conveyor disposed adjacent a lateral run of said collecting conveyor means, and a platform at said laterally running sorting conveyor for accommodating manual transfer of loose, marketable tomatoes from the laterally running sorting conveyor to said collecting conveyor run.

9. The tomato harvester of claim 8, wherein said laterally running sorting conveyor crosses said feeder conveyor means, with said manual transfer platform having portions on each side of said feeder conveyor means.

References Cited

UNITED STATES PATENTS

| | | | |
|---|---|---|---|
| 2,209,282 | 7/1940 | Rodin | 171—17 X |
| 2,783,605 | 3/1957 | Heleen | 56—330 |
| 2,793,747 | 5/1957 | Pridy | 171—130 |
| 2,896,728 | 7/1959 | Pridy | 171—130 |
| 2,901,048 | 8/1959 | Krukowski | 130—30 |
| 3,078,926 | 2/1963 | Ries et al. | 171—14 |
| 3,199,604 | 8/1965 | Lorenzen et al. | 171—27 |

ABRAHAM G. STONE, *Primary Examiner.*

ANTONIO F. GUIDA, *Examiner.*